US009244576B1

(12) United States Patent
Vadagave et al.

(10) Patent No.: US 9,244,576 B1
(45) Date of Patent: Jan. 26, 2016

(54) USER INTERFACE WITH CHILD-LOCK FEATURE

(71) Applicants: Sangamesh Vadagave, Bangalore (IN); Santhosh Kumar Vojjala, Bangalore (IN); Hassane El-Khoury, Pleasanton, CA (US)

(72) Inventors: Sangamesh Vadagave, Bangalore (IN); Santhosh Kumar Vojjala, Bangalore (IN); Hassane El-Khoury, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/725,822

(22) Filed: Dec. 21, 2012

(51) Int. Cl.
*G06F 3/044* (2006.01)
*B60R 21/015* (2006.01)

(52) U.S. Cl.
CPC .......... *G06F 3/044* (2013.01); *B60R 21/01532* (2014.10)

(58) Field of Classification Search
CPC .................. G06F 3/044; B60R 21/01532
USPC ................... 345/173–184; 178/18.01–20.04; 340/988–996; 434/62–71
See application file for complete search history.

(56) References Cited

U.S. PATENT DOCUMENTS

| 6,345,839 | B1 * | 2/2002 | Kuboki et al. ............. 280/735 |
| 6,429,543 | B1 | 8/2002 | Desai |
| 6,492,979 | B1 | 12/2002 | Kent et al. |
| 7,148,704 | B2 | 12/2006 | Philipp |
| 7,200,250 | B2 | 4/2007 | Chou |
| 8,050,876 | B2 | 11/2011 | Feen et al. |
| 2003/0040858 | A1 * | 2/2003 | Wallace ............. 701/45 |
| 2003/0220725 | A1 * | 11/2003 | Harter et al. .......... 701/36 |
| 2004/0148062 | A1 * | 7/2004 | Franke ............. 701/1 |
| 2006/0022959 | A1 * | 2/2006 | Geaghan ............ 345/173 |
| 2007/0057781 | A1 * | 3/2007 | Breed ............... 340/457.1 |
| 2007/0262965 | A1 * | 11/2007 | Hirai et al. .......... 345/173 |
| 2008/0059880 | A1 * | 3/2008 | Cato et al. .......... 715/700 |
| 2008/0166028 | A1 | 7/2008 | Turek et al. |
| 2009/0088928 | A1 * | 4/2009 | Schroeder et al. ....... 701/45 |
| 2010/0127995 | A1 | 5/2010 | Rigazio et al. |
| 2010/0156835 | A1 * | 6/2010 | Tamura ............. 345/173 |
| 2010/0171515 | A1 * | 7/2010 | Nakagawa et al. ....... 324/658 |
| 2010/0217494 | A1 * | 8/2010 | Heft et al. .......... 701/70 |
| 2011/0012618 | A1 | 1/2011 | Teterwak et al. |
| 2011/0115742 | A1 | 5/2011 | Sobel et al. |
| 2011/0279408 | A1 * | 11/2011 | Urano et al. .......... 345/174 |
| 2011/0282537 | A1 | 11/2011 | Yamasaki et al. |
| 2012/0105358 | A1 * | 5/2012 | Momeyer et al. ........ 345/174 |

FOREIGN PATENT DOCUMENTS

WO 2007010209 A1 1/2007

OTHER PUBLICATIONS

International Search Report for International Application No. PCT/US13/70333 dated Dec. 12, 2013; 3 pages.

(Continued)

*Primary Examiner* — Liliana Cerullo
(74) *Attorney, Agent, or Firm* — Lowenstein Sandler LLP (57) ABSTRACT

Apparatuses and methods of touch discrimination are described. One method receives data from an occupant classification system and sets a touch detection threshold of a touch-sensing device based on the received data. The method may be used to discriminate between an adult touch and a child touch and to selectively allow access to control functionality to adults and not to children.

21 Claims, 7 Drawing Sheets

(56) References Cited

OTHER PUBLICATIONS

Written Opinion of the International Searching Authority for International Application No. PCT/US13/70333 dated Dec. 12, 2013; 6 pages.

"Microsoft Windows 7 Touch Logo now certifies SiS capacitive touch panel controller", http://www.eeherald.com/section/news/nw10000852.html, EE Herald, Sep. 23, 2009 pp. 1 of 1.

* cited by examiner

USER INTERFACE WITH CHILD-LOCK FEATURE

TECHNICAL FIELD

The present disclosure relates generally to sensing systems, and more particularly to capacitance-sensing systems configured to discriminate between a child touch and adult touch and selectively enable or disable control functionality based on classification of the touch.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

BRIEF DESCRIPTION OF THE DRAWINGS

The present invention is illustrated by way of example, and not of limitation, in the figures of the accompanying drawings in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
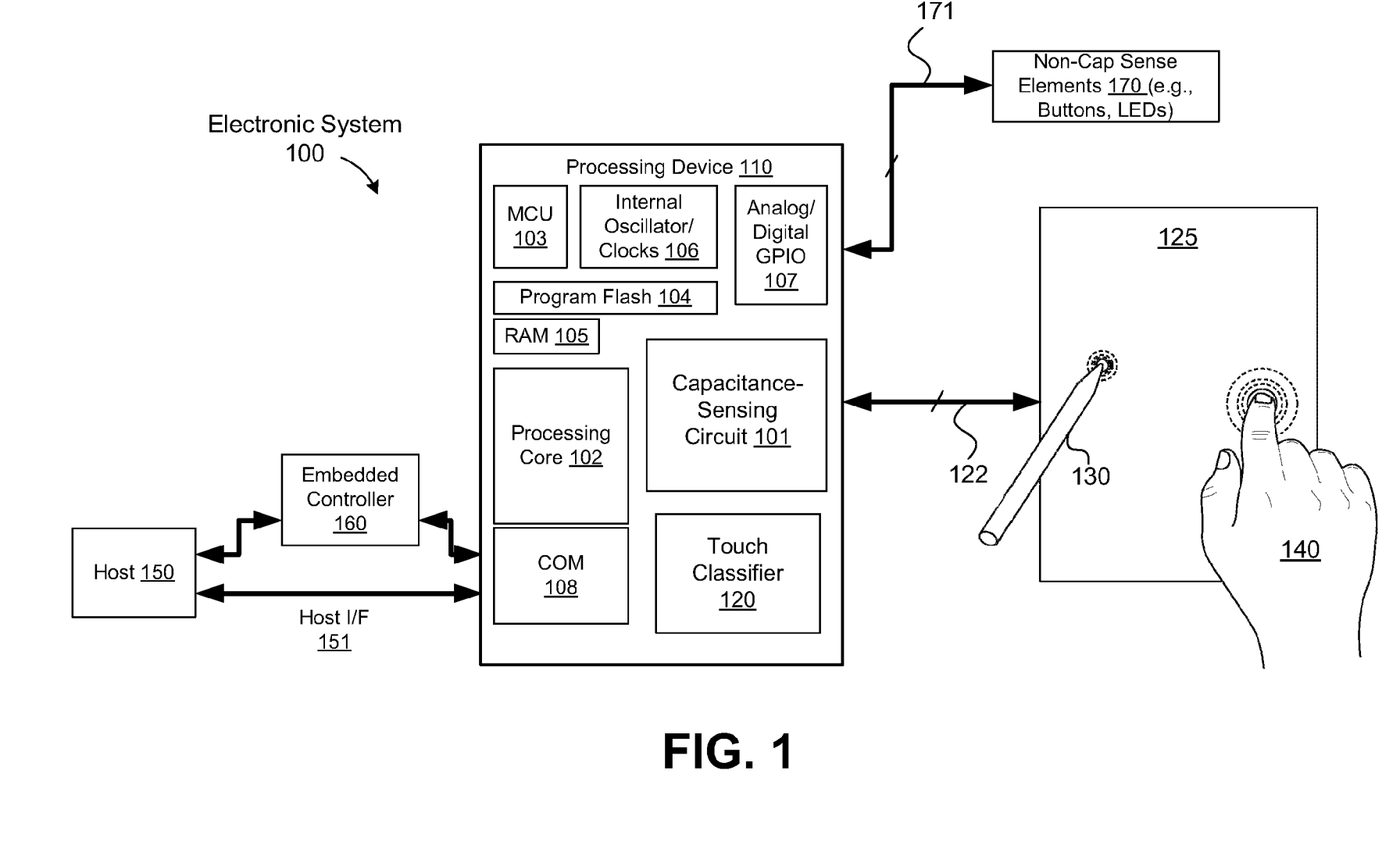
FIG. 1 is a block diagram illustrating one embodiment of an electronic system having a processing device, including a touch discriminator.

FIG. 1 is a block diagram illustrating one embodiment of an electronic system 100 having a processing device 110, including a touch discriminator 120. The processing device 110 is configured to detect one or more touches on a touch-sensing device, such as a capacitive sense array 125. The processing device can detect conductive objects, such as touch objects 140 (fingers or passive styluses, an active stylus 130, or any combination thereof). The capacitance-sensing circuit 101 can measure touch data on the capacitive sense array 125. The touch data may be represented as a multiple cells, each cell representing an intersection of sense elements (e.g., electrodes) of the capacitive sense array 125. In another embodiment, the touch data is a 2D capacitive image of the capacitive sense array 125.

In one embodiment, when the capacitance-sensing circuit 101 measures mutual capacitance of the touch-sensing device (e.g., capacitive sense array 125), the capacitance-sensing circuit 101 obtains a 2D capacitive image of the touch-sensing device and processes the data for peaks and positional information. In another embodiment, the processing device 110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

The touch discriminator 120 classifies the detected touches as either a child touch or an adult touch and selectively enables or disables access to control functionality based on the classification. The touch discriminator 120 may use any one or more of a number of different factors to classify the touch, as described in detail below. For example, the touch discriminator 120 may use finger-size information derived from the touch data, large object recognition information derived from the touch data, occupant classification information received from an occupant classification system (OCS), or other information derived from the touch data or received independent of the touch data.

In one embodiment, the touch discriminator 120 is implemented in firmware of the processing device 110. In another embodiment, the touch discriminator 120 is implemented in software, hardware, or any combination thereof. In another embodiment, the touch discriminator 120 can be implemented on the host, and the capacitive-sensing circuit 101 obtains the touch data and sends the touch data to the touch discriminator 120 on the host processor 150. Alternatively, other configurations are possible as would be appreciated by one of ordinary skill in the art having the benefit of this disclosure. It should also be noted that the peaks and precise interpolated coordinates computed from the peaks may be used for gesture recognition in various application. Additional details of the computations by the touch discriminator 120 and how the touch classifications are used to selectively enable and disable control functionality of an automotive user interface are described below with respect to FIGS. 2-7.

Electronic system 100 includes processing device 110, capacitive sense array 125, stylus 130, host processor 150, embedded controller 160, and non-capacitive sense elements 170. The capacitive sense elements are electrodes of conductive material, such as copper. The sense elements may also be part of an ITO panel. The capacitive sense elements can be configured to allow the capacitive-sensing circuit 101 to measure self capacitance, mutual capacitance, or any combination thereof. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. In another embodiment, the capacitive sense array 125 is non-transparent capacitive sense array (e.g., PC touchpad). The capacitive sense array 125 may be disposed to have a flat surface profile. Alternatively, the capacitive sense array 125 may have non-flat surface profiles. Alternatively, other configurations of capacitive sense arrays may be used. For example, instead of vertical columns and horizontal rows, the capacitive sense array 125 may have a hexagon arrangement, or the like, as would be appreciated by one of ordinary skill in the art having the benefit of this disclosure. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configured to detect a presence of the touch object 140, a presence of a stylus 130 on the capacitive sense array 125, or any combination thereof. The processing device 110 may detect and track the stylus 130 and the touch object 140 individually on the capacitive sense array 125. In one embodiment, the processing device 110 can detect and track both the stylus 130 and touch object 140 concurrently on the capacitive sense array 125. If the touching object is an active stylus, in one embodiment, the active stylus 130 is configured to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configured to detect touch objects 140, is also used to detect and track a stylus 130 without an additional PCB layer for inductively tracking the active stylus 130.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array may also be configured to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configured to measure capacitance using mutual capacitance sensing techniques, self capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the capacitive sense array 125 are configured to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. An intersection between two sense elements may be understood as a location at which one sense electrode crosses over or overlaps another, while maintaining galvanic isolation from each other. The capacitance-sensing circuit 101 does not use mutual capacitance or self-capacitance sensing to measure capacitances of the sense elements when performing a stylus sensing. Rather, the capacitance-sensing circuit 101 measures a charge that is capacitively coupled between the capacitive sense array 125 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in mutual capacitance between some of the TX/RX electrodes. In another embodiment, the presence of a finger increases the coupling capacitance of the electrodes. Thus, the location of the finger on the capacitive sense array 125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Figure 2:
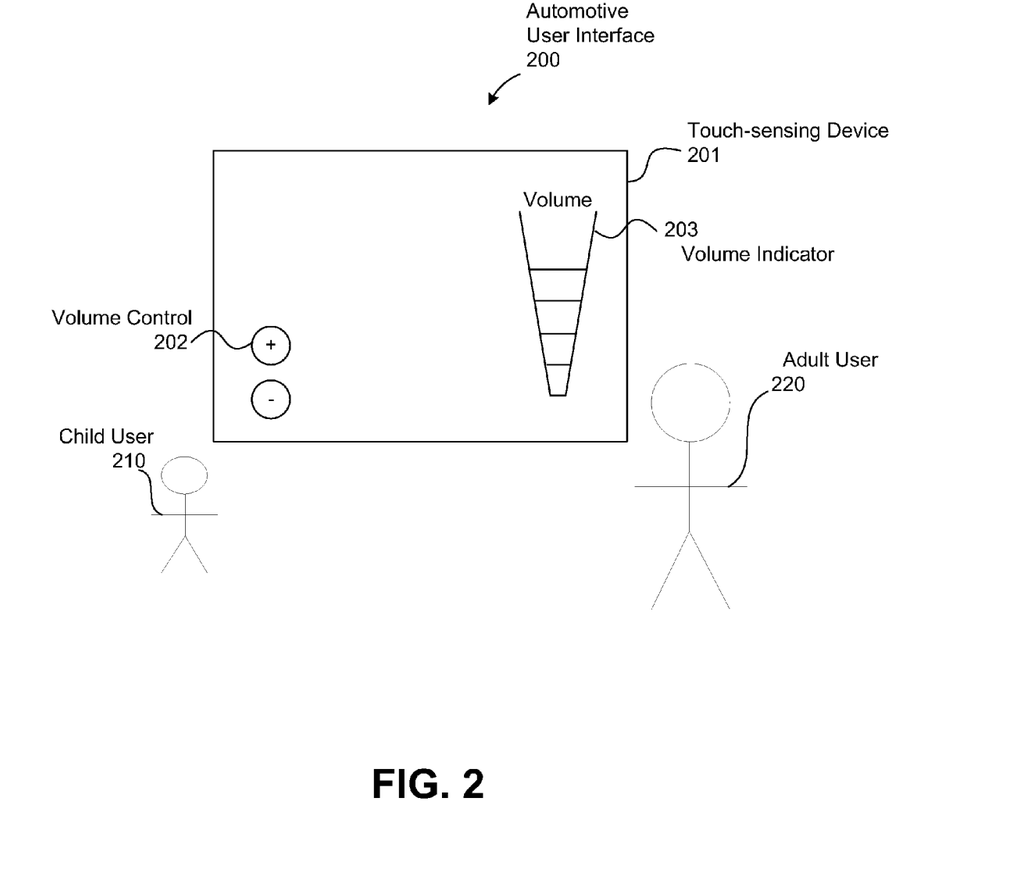
FIG. 2 illustrates an exemplary interaction with a portion of a automotive user interface.

FIG. 2 illustrates an exemplary interaction with a portion of a automotive user interface 200. An automobile, such as a car, truck, van, bus, train, airplane, or any other conveyance of persons, may include a user interface to access various applications. For example, the automotive user interface 200 may provide access to entertainment applications, such as a radio or other media player. The automotive user interface 200 may provide access to navigation systems or other information-providing applications. The automotive user interface 200 may allow a user to control other automotive systems, such as the windows, doors, or HVAC (heating, ventilation, and air conditioning). The automotive user interface 200 may allow access to other applications and system components.

The automotive user interface 200 may include a number of input devices, such as buttons, touch surfaces, keypads, and other touch-sensing devices 201. The automotive user interface 200 may also include other non-touch input devices. It may be advantageous to locate one or more touch-sensing devices 201 so as to be accessible by passengers in the vehicle. However, it may be disadvantageous to allow children to have the same access to certain applications as adult passengers. For example, the touch-sensing device 201 may include a volume control 202 which, when touched, controls the volume of media played by an entertainment system (as indicated by a volume indicator 203). It may be advantageous to allow an adult user 220 to access the volume control 202, but disadvantageous to allow a child user 210 to access the volume control 202.

Thus, to provide a pleasant driving experience while driving with a child passenger, to provide a safer environment for children, and to provide a value-add application to customers, a "child-lock" feature which limits a child's access to control functionality of the applications via the automotive user interface may be provided. The child-lock feature can be implemented in a number of ways as described in detail below. In one embodiment, the sensitivity of the touch-sensing device 201 is decreased to a level where an adult touch is detected, whereas a child touch is disregarded. The child-lock feature may be manually triggered from a dashboard or control input or may be automatically triggered based on input from an occupant classification system (OCS) including a seat belt position/stress detection system. Enabling and disabling the child-lock feature may be indicated by changing a state of the PSoC or microcontroller pin between high (e.g., 5 volts) and low (e.g, 0 volts).

Figure 3:
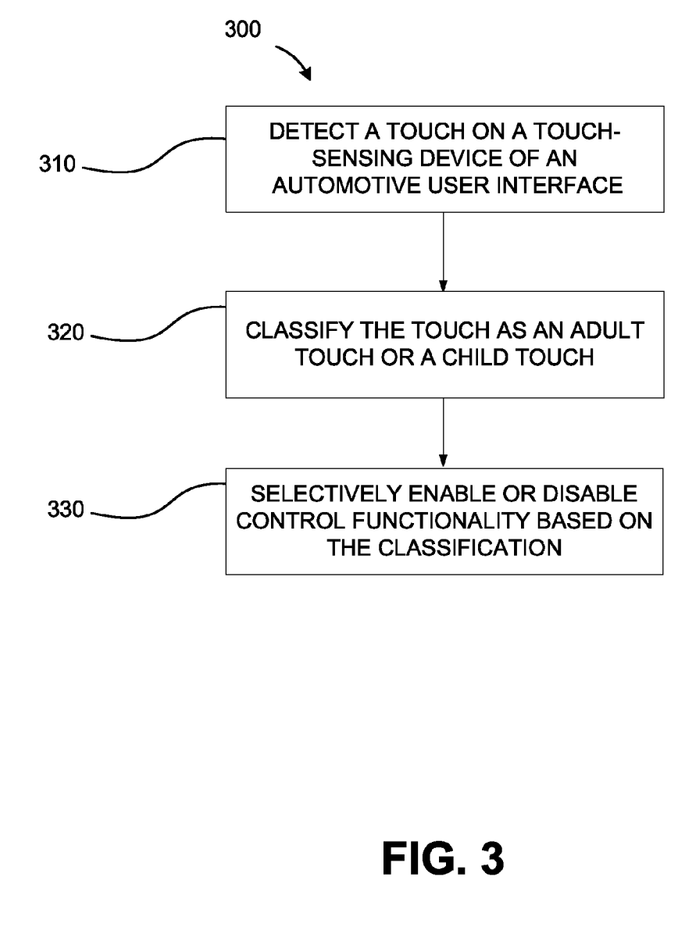
FIG. 3 is a flow diagram of a method of selectively enabling or disabling control functionality of an automotive user interface.

FIG. 3 is a flow diagram of a method 300 of selectively enabling or disabling functionality of an automotive user interface. The method 300 begins, in block 310, with the detection of a touch on a touch-sensing device of an automotive user interface. The touch-sensing device may be, for example, the touch-sensing device 201 of FIG. 2, the capacitive sense array 125 of FIG. 1, or any other touch-sensing device.

In block 320, the detected touch is classified as a child touch or an adult touch. The classification may be based on a number of different factors. The classification may be based on information derived from touch data associated with the touch returned from the touch-sensing device, such as finger-size information or large object recognition information. The classification may be based on information received independent of the touch data, such as information received from an occupant classification system (OCS), manually entered user input, or other data.

Figure 4:
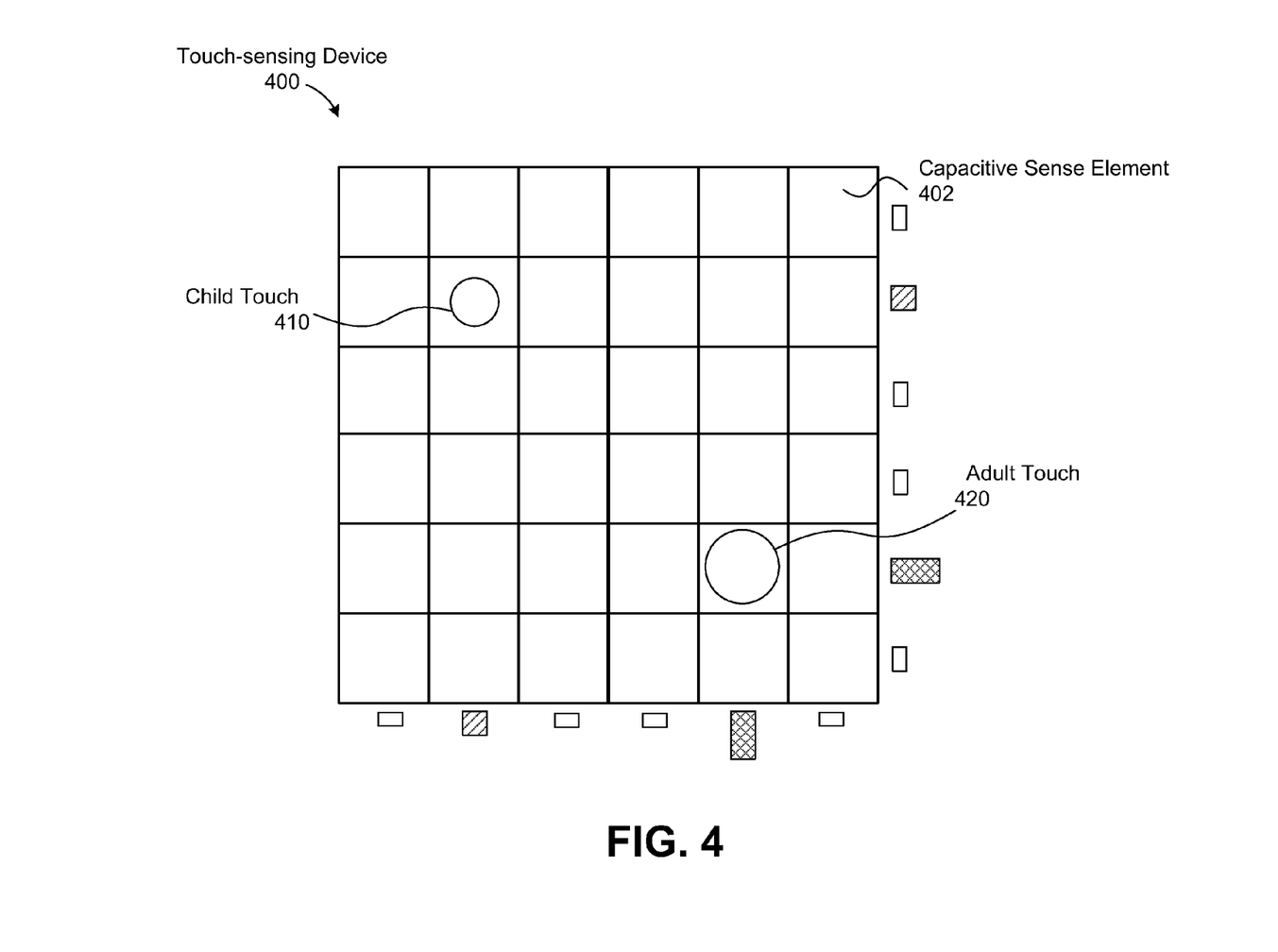
FIG. 4 illustrates exemplary data received from an child touch and an adult touch.

As mentioned above, the classification performed in block 320 may be based on finger-size information. FIG. 4 illustrates exemplary data received from an child touch 410 and an adult touch 420 on an exemplary touch-sensing device 400. The touch-sensing device 400 comprises a plurality of capacitive sense elements 402 arranged in a grid. The capacitance introduced by the presence of a finger on a capacitive sense element is directly proportional to the area of the finger. Thus, a child touch 410 induces a first capacitance at a particular location of the grid, whereas an adult touch 420 induces a second, larger capacitance at a particular location of the grid. Whereas the finger area of an adult with a 10 millimeter (mm) diameter finger is four times more than the finger area of a child with a 5 mm finger, the capacitance induced by a adult touch (of such an adult) is similarly four times the capacitance induced by a child touch (of such a child).

The capacitance information associated with a particular touch may be provided in the form of digital capacitance counts indicative of the amount of capacitance induced by a touch. In one embodiment, the number of digital counts, or signal level, of a child finger with a diameter of 6 mm is around 90 counts and the signal level of an adult finger with a diameter of 10 mm is around 150 counts. By comparing the number of counts to a threshold, the touch can be classified as a child touch if the number of counts is below the threshold or as an adult touch if the number of counts is above the threshold. The threshold may be set, for example, at 125 counts. The threshold may be set at another value.

Thus, the capacitance information associated with a particular touch can be used to classify the touch as an adult touch or a child touch. In one embodiment, the capacitance information is, by itself, sufficient to classify the touch. In another embodiment, the capacitance information is used with other information to classify the touch. The various information can be combined to classify the touch in a variety of ways, including, for example, heuristics, Bayesian analysis, and other methods.

Figure 5:
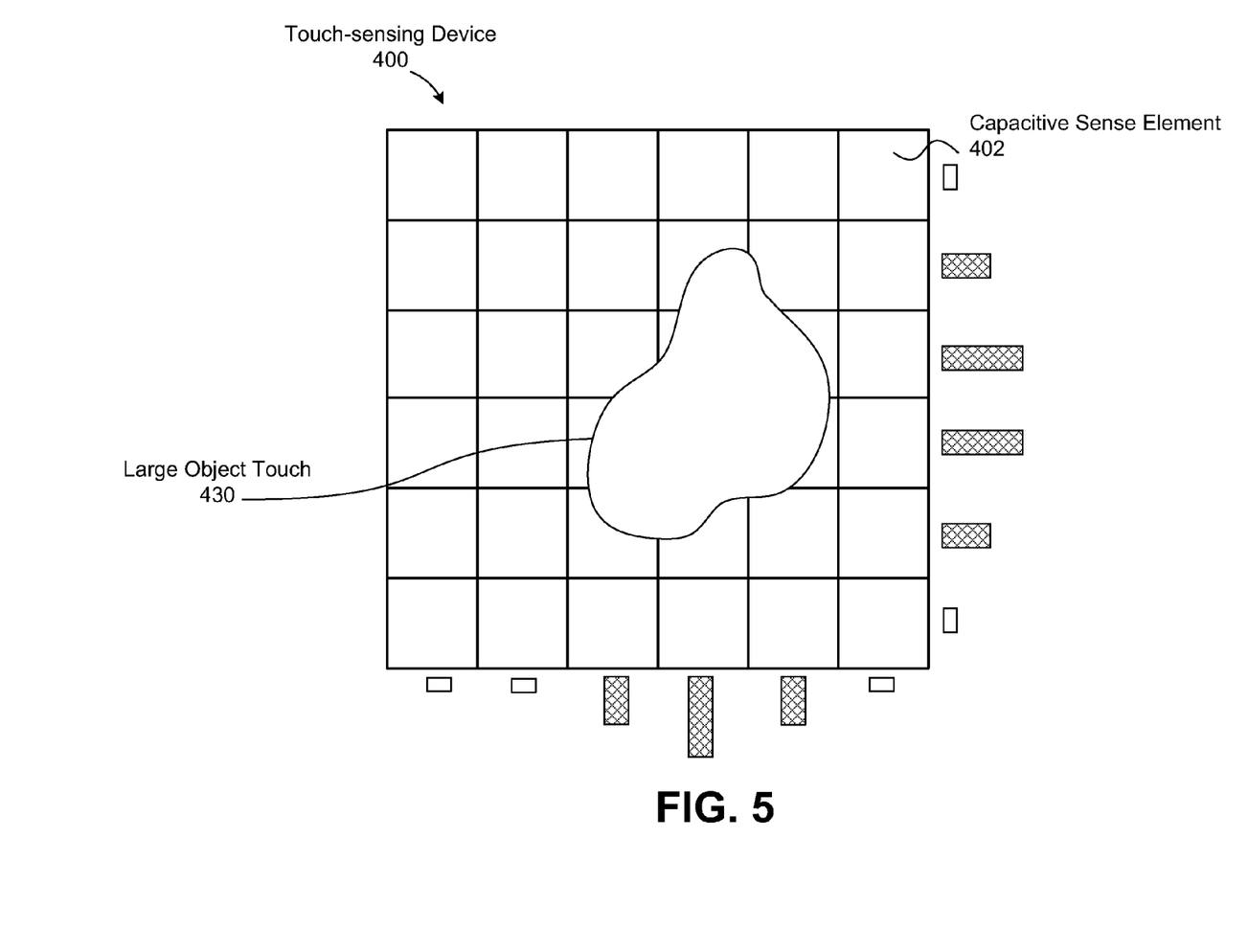
FIG. 5 illustrates exemplary data received from large object touch.

As mentioned above, the classification performed in block 320 may be based on large object recognition information. FIG. 5 illustrates exemplary data received from large object touch 430 on the touch-sensing device 400 of FIG. 4. As shown in FIG. 5, multiple adjacent sensors are activated in the presence of a large object, such as the palm of a child or an adult. Other large objects may also activate multiple adjacent sensors, such as an inadvertent touch of the touch-sensing device 400 with a knee or a conductive object. A large object detection threshold can be set to reject large object touches when more than a threshold number of adjacent sensors are activated at the same time. For example, the threshold number may be 12.

In one embodiment, a detected large object touch is classified as a child touch so as to similarly treat intentional child touches by a child's palm and unintentional touches by an adult palm, knee, or other object. In another embodiment, a large object touch is classified as neither a child touch or an adult touch.

As mentioned above, the classification performed in block 320 may be based on information received from an occupant classification system (OCS). An OCS includes a number of sensors with which to detect the presence of a passenger and classify the passenger as an adult or a child. For example, an OCS may include one or more seat pressure sensors which provides information about the amount of weight in one or more respective seats. If the weight in a particular seat is above a detection threshold, e.g. 30 pounds, a passenger is detected. If the weight is above an adult detection threshold, e.g. 80 pounds, the passenger is classified as an adult, whereas if the weight is below the adult detection threshold, the passenger is classified as a child.

An OCS may include one or more seat belt tension sensors which provide information about whether and to what extent a seat belt is deployed. An OCS may include one or more image sensors, such as a camera, which provides visual information which can be used to detect and classify passengers. An OCS may include other sensors.

As mentioned above, the classification performed in block 320 may be based on information received from a user. For example, the driver may manually input information regarding the presence, number, position, and classification of passengers.

The method 300 continues, in block 330, by selectively enabling or disabling at least a portion of control functionality associated with touch-sensing device based on the classification. In one embodiment, touches classified as a child touch are disregarded or ignored by the system, thus disabling control functionality, whereas touches classified as an adult touch are processed by the system, thus enabling control functionality.

In one embodiment, certain control functionality can be accessed by a child, but other control functionality is disabled for access by a child. For example, a child may be enabled to change the channel of a rear seat entertainment system via a channel control, but disabled from increasing the volume via a volume control, whereas an adult may be enabled to change the channel and adjust the volume. As another example, a child may be enabled to play on a touchscreen (e.g., to draw), but not enabled to play movies. As another example, a child may be able to roll down a window, but not open a door.

Control functionality may be partially enabled and partially disabled based on the classification of the touch. For example, a window control may be partially enabled for a child touch allowing a window to be partially rolled down and partially disabled for the child touch disallowed the window to be fully rolled down, whereas the window control may be fully enabled for an adult touch allowing the window to be fully rolled down.

Other control functionality can be selectively enabled or disabled based on the classification of the touch, including entertainment applications, information applications, window controls, door controls, sunroof controls, HVAC controls, or any other control functionality.

Figure 6:
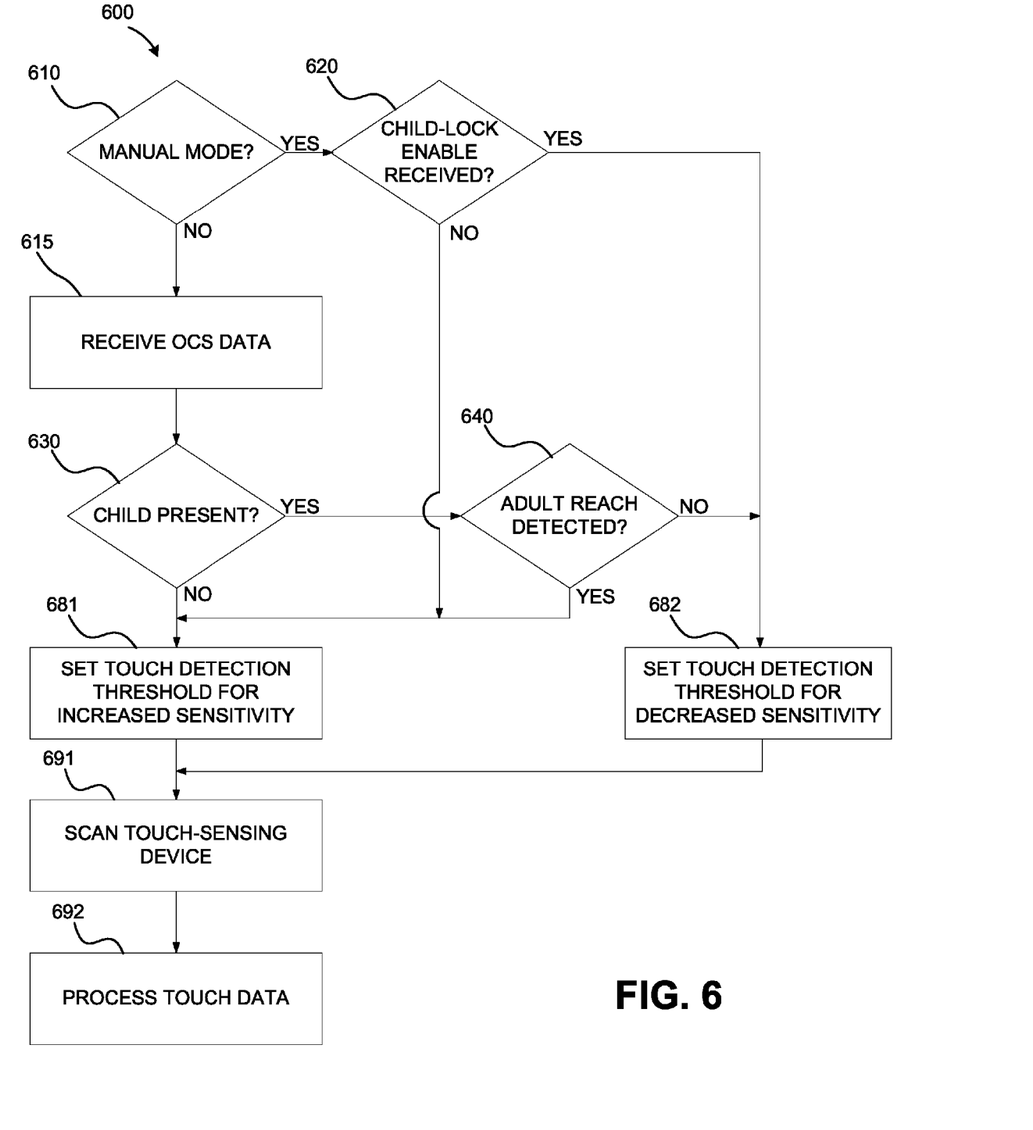
FIG. 6 is a flow diagram of a method of operating an automotive user interface with a child-lock feature.

FIG. 6 is a flow diagram of a method 600 of operating an automotive user interface with a child-lock feature. The method 600 begins, in block 610, with determining whether the child-lock feature is to be operated in a manual mode or an automatic mode. In one embodiment, the child-lock feature operates in a manual mode and is enabled only when, in block 620, it is determined that a user has input that the child-lock feature is to be enabled. In another embodiment, the child-lock feature operates in an automatic mode and is enabled automatically when it is determined certain criteria are met such as, e.g. those discussed below with respect to blocks 630 and 640. In one embodiment, the automotive user interface can be toggled between a manual mode and an automatic mode by a user. In another embodiment, the automotive user interface is permanently set into either a manual mode or automatic mode.

If it is determined, in block 610, that the child-lock feature is to be operated in a manual mode, the method 600 moves to block 620 where it is determined whether a child-lock enable user input has been received. The child-lock enable user input may be received from the driver from a dashboard control or another user input device.

If it determined, in block 620, that a child-lock enable user input has not been received, the child-lock feature is not enabled and the method 600 moves to block 681 where a touch detection threshold is set for increased sensitivity so as to allow control functionality access by both child touches and adult touches. For example, the touch detection threshold may be set to allow control functionality access by touches made by fingers having a diameter of 3 mm or greater. The touch detection threshold may be set to 40 digital counts, 60 digital counts, or any other number of digital counts.

If it is determined, in block 620, that a child-lock enable user input has been received, the child-lock feature is enabled and the method 600 moves to block 682 where a touch detection threshold is set for decreased sensitivity so as to allow control functionality access by adult touches and not by child touches. For example, the touch detection threshold may be set to allow control functionality access by touches made by fingers having a diameter of 9 mm or greater. The touch detection threshold may be set to 110 digital counts, 125 digital counts, or any other number of digital counts.

From both blocks 681 and 682, the method 600 proceeds to block 691 where a touch-sensing device is scanned to produce touch data. In one embodiment, the touch-sensing device includes a capacitive sense element and the touch data includes a number of digital counts. In block 692, the touch data is processed. Processing the touch data includes comparing the touch data to the touch detection threshold set in either block 681 or 682. In one embodiment, the touch data includes a number of digital counts and processing the touch data in block 692 includes comparing the number of digital counts to the touch detection threshold. Processing the touch data may include, e.g., if the number of digital counts is above the touch detection threshold, complying with a requested control functionality.

If it is determined, in block 610, that the child-lock feature is not to be operated in a manual mode, but rather, an automatic mode, the method 600 moves to block 615 where occupant classification system (OCS) data is received. The OCS data, as described above, may include information regarding the presence, number, and classification of occupants, including passengers. The OCS data may include seat belt information indicative of whether and to what extent a seat belt is deployed.

From block 615, method 600 moves to block 630 where it is determined if a child is present based on the OCS data. If a child is not present, the child-lock feature is not enabled and the method 600 moves to block 681 where the touch detection threshold is set to increased sensitivity as described above. If a child is present, in one embodiment not illustrated by FIG. 6, the method moves directly to block 682 where the touch detection threshold is set to decreased sensitivity as described above. However, in the method 600 illustrated in FIG. 6, if a child is present, the method 600 moves to block 640 where it is determined whether an adult reach is detected based on the OCS data.

An adult reach is detected when an adult is leaning forward to access a portion of the automotive user interface. An adult reach may be detected based on seat belt deployment data indicative of increased deployment. An adult reach may also be detected based on image data taken by a camera of the OCS. An adult reach may be detected by other methods or using other data.

If an adult reach is not detected in block 640, the child-lock feature is enabled and the method 600 moves to block 682 where the touch detection threshold is set to decreased sensitivity as described above. However, if an adult reach is detected in block 640, even though it was determined that a child was present in block 630, the child-lock feature is not enabled and the method 600 moves to block 681 where the touch detection threshold is set to increased sensitivity as described above. Thus, for example, if an adult is wearing a glove which would result in an adult touch with fewer digital counts, the touch would be processed and control functionality realized as the touch detection threshold is set to increased sensitivity based on the detection of an adult reach based on data from the OCS.

If seat belt stress is detected on both the driver's seatbelt and the seat belt of a passenger classified as a child, whether the method proceeds to block 681 or 682 can optionally configured. In one embodiment, the method proceeds to block 681 as the driver's input is prioritized always allowing the driver to access full control functionality.

As described above, from either of blocks 681 or 682, the method 600 moves to blocks 691 and 692. From block 692, the method 600 repeats, returning to block 610. The method 600 may include fewer blocks than shown or include additional blocks not shown. For example, the method 600 may incorporate large object touch rejection such that when a large object touch is detected control functionality is not realized. In one embodiment, a large object touch is detected if more than a threshold number of adjacent sensors are activated. In another embodiment, a main sensor associated with a control functionality is surrounded by adjacent guard sensors and a large object touch is detected if one or more than a threshold number of the guard sensors are activated.

For safety purposes, when a collision, crash, or other emergency is detected, the child-lock feature is automatically and completely disabled allowing full control functionality to all passengers.

Figure 7:
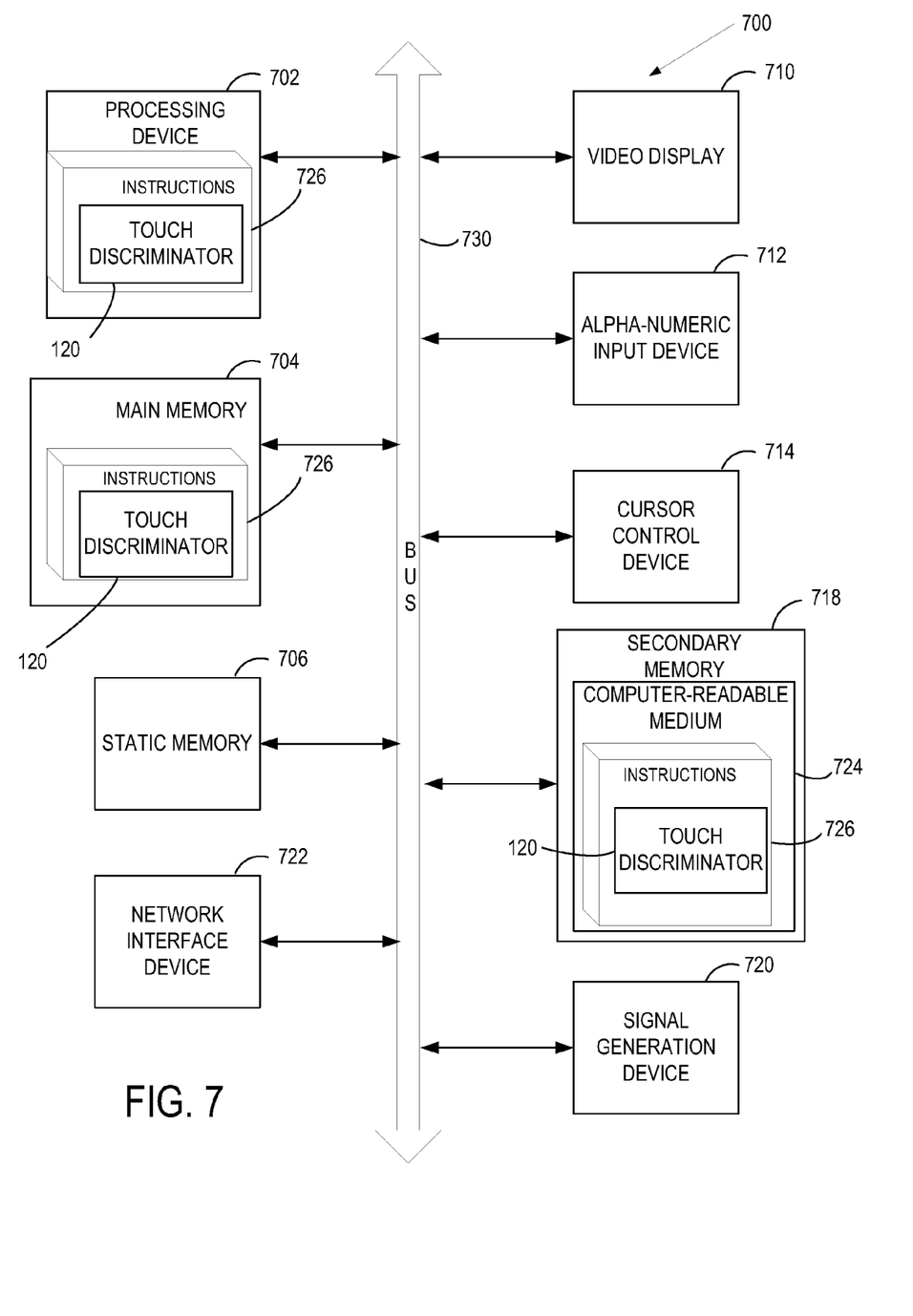
FIG. 7 is a diagram of one embodiment of a computer system for touch discrimination.

FIG. 7 is a diagram of one embodiment of a computer system for peak detection. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702 (e.g., host processor 150 or processing device 110 of FIG. 1), a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 718 (e.g., a data storage device in the form of a drive unit, which may include fixed or removable computer-readable storage medium), which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 embodying any one or more of the methodologies or functions described herein. In one embodiment, the instructions 726 include instructions for the touch discriminator 120. The instructions 726 may also reside, completely or at least partially, within the main memory 704 and/or within the processing device 702 during execution thereof by the computer system 700, the main memory 704 and the processing device 702 also constituting machine-readable storage media.

The computer-readable storage medium 724 may also be used to store the instructions 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in any combination of hardware devices and software components.

Although the above description has focused on the use case of an automotive user interface, the aspects and embodiments described herein can be used in other environments. For example, a child-lock feature can be implemented on a touchscreen tablet device. The child-lock feature can be manually enabled via a user input, e.g. the touchscreen, a mechanical toggle switch, or another input.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting,"

"executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   setting a capacitive touch detection threshold of an input touch-sensing device based on input from a seat occupant classification system;
   detecting a touch at a location of a capacitive sense element of a plurality of capacitive sense elements comprised by the input touch-sensing device of a vehicle user interface;
   classifying, by a processing device and based on a plurality of factors, whether the touch is a child touch or an adult touch, wherein the plurality of factors comprises comparing an amount of capacitance induced by the touch at the location of the capacitive sense element of the input touch-sensing device to the capacitive touch detection threshold; and
   selectively enabling or disabling at least a portion of control functionality of the vehicle user interface based on the classification.

2. The method of claim 1, wherein the input touch-sensing device comprises a capacitive sense array.

3. The method of claim 1, wherein the plurality of factors comprises a finger-size associated with the touch.

4. The method of claim 1, wherein the plurality of factors comprises a large object detection threshold.

5. The method of claim 1, wherein the seat occupant classification system comprises at least one of a seat pressure sensor, a seat belt tension sensor, or an image sensor.

6. The method of claim 1, wherein classifying whether the touch is the child touch or the adult touch is based on comparing a digital capacitance count indicative of the amount of capacitance induced by the touch at the location of the capacitive sense element of the input touch-sensing device to the capacitive touch detection threshold.

7. The method of claim 1, wherein selectively enabling or disabling at least a portion of control functionality of the vehicle user interface is further based on a user input enabling a child-lock feature.

8. The method of claim 1, wherein the control functionality of the vehicle user interface comprises at least one of a volume control, a channel control, a window control, or a door control.

9. The method of claim 1, wherein the input from the seat occupant classification system comprises input from a rear seat.

10. A system comprising:
   an input touch-sensing device; and
   a processing device coupled to the input touch-sensing device, wherein the processing device is to:
   set a capacitive touch detection threshold of an input touch-sensing device based on input from a seat occupant classification system;
   detect a touch at a location of a capacitive sense element of a plurality of capacitive sense elements comprised by the input touch-sensing device;
   classify, based on a plurality of factors, whether the touch is a child touch or an adult touch, wherein the plurality of factors comprises comparing an amount of capacitance induced by the touch at the location of the capacitive sense element of the input touch-sensing device to the capacitive touch detection threshold; and
   selectively enable or disable at least a portion of control functionality associated with the input touch-sensing device based on the classification.

11. The system of claim 10, wherein the input touch-sensing device comprises a capacitive sense array.

12. The system of claim 10, wherein the plurality of factors comprises at least one of a finger-size associated with the touch or a large object detection threshold.

13. The system of claim 10, wherein the seat occupant classification system comprises at least one of a seat pressure sensor, a seat belt tension sensor, or an image sensor.

14. The system of claim 10, wherein the processing device is to classify whether the touch is the child touch or the adult touch based on comparing a digital capacitance count indicative of the amount of capacitance induced by the touch at the location of the capacitive sense element of the input touch-sensing device to the capacitive touch detection threshold.

15. The system of claim 10, wherein the input from the seat occupant classification system comprises input from a rear seat.

16. A method comprising:
   receiving data from a seat occupant classification system to classify a seat occupant as a child or an adult; and
   setting a capacitive touch detection threshold of an input touch-sensing device based on the received data, wherein the input touch-sensing device is to detect a touch by comparing an amount of capacitance induced by the touch at a location of a capacitive sense element of a plurality of capacitive sense elements comprised by the input touch-sensing device to the capacitive touch detection threshold.

17. The method of claim 16, wherein the received data comprises at least one classification of an occupant.

18. The method of claim 16, wherein the received data comprises seat belt deployment data.

19. The method of claim 16, wherein setting the capacitive touch detection threshold comprises:
   setting the capacitive touch detection threshold to a first value for decreased sensitivity in response to the received data indicating that a child is detected and an adult reach is not detected; or
   setting the capacitive touch detection threshold to a second value for increased sensitivity in response to the received data indicating that a child is not detected or an adult reach is detected.

20. The method of claim 16, further comprising determining whether a manual mode or an automatic mode has been selected.

21. The method of claim 16, wherein the seat occupant classification system is to classify the occupant of a rear seat.

* * * * *